(12) United States Patent
Jang et al.

(10) Patent No.: US 8,749,735 B2
(45) Date of Patent: Jun. 10, 2014

(54) COLOR FILTER AND DISPLAY DEVICES INCLUDING THE SAME

(75) Inventors: Jae-eun Jang, Seoul (KR); Seung-nam Cha, Seoul (KR); Jae-eun Jung, Seoul (KR); Yong-wan Jin, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 281 days.

(21) Appl. No.: 12/926,725

(22) Filed: Dec. 7, 2010

(65) Prior Publication Data
US 2011/0261303 A1    Oct. 27, 2011

(30) Foreign Application Priority Data

Apr. 23, 2010  (KR) .......................... 10-2010-0038103

(51) Int. Cl.
*G02F 1/1335* (2006.01)
*G02F 1/1333* (2006.01)
*G02F 1/1347* (2006.01)

(52) U.S. Cl.
USPC .................. 349/106; 349/74; 349/86; 349/87

(58) Field of Classification Search
USPC .............................. 349/74, 86, 87, 106, 111
See application file for complete search history.

(56) References Cited

U.S. PATENT DOCUMENTS

| 6,144,359 | A  | * | 11/2000 | Grave ........................... 345/102 |
| 6,690,443 | B1 | * | 2/2004 | Poliakine ...................... 349/152 |
| 2003/0011728 | A1 | * | 1/2003 | Battersby ...................... 349/106 |
| 2010/0171903 | A1 | * | 7/2010 | Okuyama ....................... 349/65 |

FOREIGN PATENT DOCUMENTS

| JP | 1995-110477 |   | 4/1995 |
| JP | 2006-221050 |   | 8/2006 |
| JP | 2006221050 | A * | 8/2006 |
| JP | 2008-191251 |   | 8/2008 |
| KR | 2001-0097934 |   | 11/2001 |
| KR | 2001-0097934 | * | 10/2002 |
| KR | 10-2007-0059525 |   | 6/2007 |

* cited by examiner

*Primary Examiner* — Jessica M Merlin
(74) *Attorney, Agent, or Firm* — Harness, Dickey & Pierce, P.L.C.

(57) ABSTRACT

A color filter and display devices using the same are provided, the color filter includes a first electrode and a second electrode spaced apart from each other; and a variable filter layer between the first electrode and the second electrode. The variable filter layer includes a polymer, liquid crystal dispersed in the polymer, and a plurality of color display materials mixed in the liquid crystal.

12 Claims, 6 Drawing Sheets

COLOR FILTER AND DISPLAY DEVICES INCLUDING THE SAME

CROSS-REFERENCE TO RELATED APPLICATIONS

This application claims the priority under 35 U.S.C. §119 from Korean Patent Application No. 10-2010-0038103, filed on Apr. 23, 2010, in the Korean Intellectual Property Office, the disclosures of which are incorporated herein in their entirety by reference.

BACKGROUND

1. Field

Example embodiments relate to a color filter and display devices including the same.

2. Description of the Related Art

Recently, as portable display devices (e.g., mobile phones, personal digital assistants (PDAs), portable multimedia players (PMPs) and digital multimedia broadcasting (DMB) devices) have widely spread, the need for display devices with low power consumption and high visibility has increased.

Among the display devices, reflective display devices have attracted much attention. Reflective display devices form an image by using an external light source (e.g., solar light or an external illumination light), instead of using a backlight. Thus, reflective display devices are useful in terms of power consumption. However, because the amount of light used to form an image varies depending on the surrounding luminance, a constant image quality may not be maintained.

Various designs of a transflective display device, which is a combination of a reflective display device and a transmissive display device, have been proposed. The transflective type display device is designed by considering both variation in luminance depending on the degree of an external illumination, and power consumption.

SUMMARY

Example embodiments relate to a color filter and display devices including the same.

A color filter configured to control a color function according to an external illumination environment and a reflective display device including the color filter are provided.

Additional aspects will be set forth in part in the description which follows and, in part, will be apparent from the description, or may be learned by practice of the presented embodiments.

According to example embodiments, a color filter includes a first electrode and a second electrode that are spaced apart from each other, and a variable filter layer that is formed between the first electrode and the second electrode. The variable filter layer includes a polymer, a plurality of liquid crystals dispersed in the polymer, and a plurality of color display materials mixed in the liquid crystals. The liquid crystals may be in the form of drops or droplets.

The variable filter layer may be divided into a plurality of pixel units each including a plurality of sub-pixels. The color display materials included in each of the plurality of sub-pixels display different colors.

The plurality of sub-pixels may display red, green and blue colors, or may display yellow, magenta and cyan colors.

The color display materials may include a dichroic dye, a quantum dot or a fluorescent dye.

The color filter may further include a barrier wall for dividing the plurality of sub-pixels between the first electrode and the second electrode.

According to example embodiments, a display device includes a color filter including a first electrode and a second electrode that are spaced apart from each other, and a variable filter layer that is formed between the first electrode and the second electrode. The variable filter layer includes a polymer, a plurality of liquid crystal drops dispersed in the polymer, and a plurality of color display materials mixed in the liquid crystal drops. The variable filter layer is divided into a plurality of pixel units each including a plurality of sub-pixels displaying different colors. The display device further includes an optical shutter portion in which transmittance of incident light is individually controlled in a region corresponding to each of the sub-pixels. The optical shutter portion includes an optical shutter layer. The optical shutter layer includes a material wherein transmittance of incident light varies under electrical control. The optical shutter layer is disposed on the color filter. The display device further includes a reflection layer that is formed under the color filter and reflects light entering through the color filter in a direction towards the color filter.

The optical shutter portion may include the optical shutter layer, a common electrode formed on a first surface of the optical shutter layer, a plurality of pixel electrodes formed on a second surface (opposing the first surface) of the optical shutter layer so as to correspond to the plurality of sub-pixels, and a thin film transistor (TFT) array layer in which a plurality of TFTs for driving the plurality of pixel electrodes are arrayed.

The optical shutter layer may include a polymer dispersed liquid crystal mixed with a black dye.

The pixel electrodes and the TFT array layer may be formed on the optical shutter layer or under the optical shutter layer.

Each of the pixel electrodes may be connected to the TFT array layer by a contact hole passing through the color filter and the reflection layer, wherein the TFT array layer is formed under the reflection layer.

The color display material may include a dichroic dye, a quantum dot or a fluorescent dye.

At least one of the first and second electrodes may have a mesh pattern.

According to example embodiments, a display device includes a color filter including a first electrode and a second electrode that are spaced apart from each other, and a variable filter layer that is formed between the first electrode and the second electrode. The variable filter layer includes a polymer, a plurality of liquid crystal drops dispersed in the polymer, and a plurality of color display materials mixed in the liquid crystal drops. The variable filter layer is divided into a plurality of pixel units each including a plurality of sub-pixels displaying different colors. The display device further includes an optical shutter portion that is disposed under the color filter. The optical shutter portion includes an optical shutter layer including a material wherein transmittance of incident light varies under electrical control, a common electrode formed on the optical shutter layer, a plurality of pixel electrodes formed under the optical shutter layer so as to correspond to the plurality of sub-pixels, and a thin film transistor (TFT) array layer in which a plurality of TFTs for driving the plurality of pixel electrodes are arrayed. The display device further includes a reflection layer that is formed on the pixel electrodes and reflects light entering through the optical shutter layer in a direction towards the optical shutter layer.

According to example embodiments, a display device includes a color filter including a first electrode and a second electrode that are spaced apart from each other, and a variable filter layer that is formed between the first electrode and the second electrode. The variable filter layer includes a polymer, a plurality of liquid crystal drops dispersed in the polymer, and a plurality of color display materials mixed in the liquid crystal drops. The variable filter layer is divided into a plurality of pixel units each including a plurality of sub-pixels displaying different colors. The display device further includes an optical shutter portion which is disposed on the color filter and in which transmittance of incident light is individually controlled in a region corresponding to each of the sub-pixels, wherein one of the first and second electrodes is formed of a reflective metal material.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
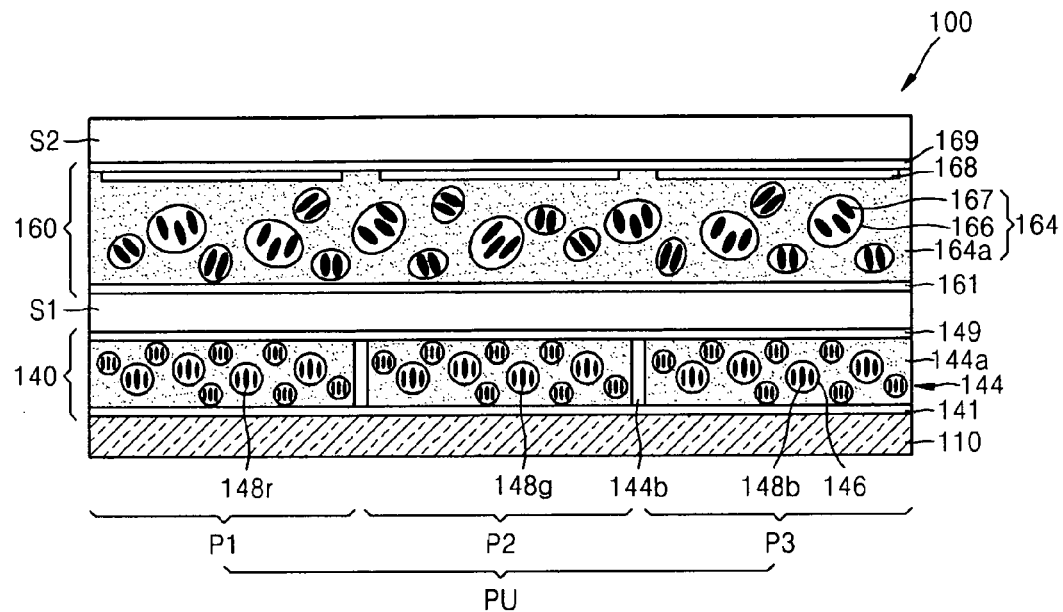
FIG. 1 is a schematic cross-sectional view illustrating a display device including a color filter according to example embodiments.

Various example embodiments will now be described more fully with reference to the accompanying drawings in which some example embodiments are shown. However, specific structural and functional details disclosed herein are merely representative for purposes of describing example embodiments. Thus, the invention may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the invention.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

In order to more specifically describe example embodiments, various aspects will be described in detail with reference to the attached drawings. However, the present invention is not limited to example embodiments described.

Example embodiments relate to a color filter and display devices including the same.

FIG. 1 is a schematic cross-sectional view illustrating a display device including a color filter according to example embodiments.

Referring to FIG. 1, a display device 100 includes a color filter 140, an optical shutter portion 160 and a reflection layer 110.

The color filter 140 includes a first electrode 141 and a second electrode 149 that are spaced apart from each other, and a variable filter layer 144 including a polymer 144a formed between the first electrode 141 and the second electrode 149, a plurality of liquid crystal drops 146 dispersed in the polymer 144a of the variable filter layer 144, and color display materials 148r, 148g and 148b that are mixed in the liquid crystal drops 146. The color display materials 148r, 148g and 148b may use a dichroic dye. The variable filter layer 144 may be manufactured by hardening a mixture of a liquid crystal, a polymer and a dye using ultra-violet rays or heat, thereby causing phase separation of the liquid crystal and the polymer.

The variable filter layer 144 may be divided into a plurality of pixel units PU each unit including plurality sub-pixels P1, P2 and P3 (only one pixel unit PU is illustrated in FIG. 1). Each sub-pixel may display different colors (e.g., P1 may display a red color, P2 may display a green color and P3 may display a blue color). In this case, in a region of the variable filter layer 144 corresponding to the sub-pixel P1, the color display material 148r, which reflects red and absorbs other colors in incident white light, is mixed in the liquid crystal drops 146. In a region of the variable filter layer 144 corresponding to the sub-pixel P2, the color display material 148g, which reflects green and absorbs other colors, is mixed in the liquid crystal drops 146. In a region of the variable filter layer 144 corresponding to the sub-pixel P3, the color display material 148b, which reflects blue and absorbs other colors, is mixed in the liquid crystal drops 146.

In FIG. 1, the color display materials 148r, 148g and 148b include dyes that respectively display red, green and blue color, but are not limited thereto. For example, the color display materials 148r, 148g and 148b may include dyes that respectively display yellow, magenta and cyan colors.

A barrier wall 144b configured to divide the plurality of sub-pixels P1, P2 and P3 may further be formed between the first electrode 141 and the second electrode 149. For example, a barrier wall 144b may be formed between the sub-pixel P1 and the sub-pixel P2, and another barrier wall 144b may be formed between the sub-pixel P2 and the sub-pixel P3.

The optical shutter portion 160 is disposed on the color filter 140. In the optical shutter portion 160, transmittance of incident light is individually controlled in a region corresponding to each of the sub-pixels P1, P2 and P3. The optical shutter portion 160 includes an optical shutter layer 164 formed of a material wherein the transmittance of incident light varies under electrical control. The optical shutter layer 164 may be formed of a polymer wherein liquid crystal, which includes a black dye, is dispersed in the polymer. That is, the optical shutter layer 164 may include a polymer 164a, a plurality of liquid crystal drops 166 dispersed in the polymer 164a, and a black dye 167 mixed in the liquid crystal drops 166. A common electrode 161 is formed on a first surface of the optical shutter layer 164, and a plurality of pixel electrodes 168 and a thin film transistor (TFT) array layer 169 are formed on a second surface (opposite to the first surface) of the optical shutter layer.

The plurality of pixel electrodes 168 are respectively formed to correspond to the plurality of sub-pixels P1, P2 and P3. The TFT array layer 169 includes a plurality of TFTs (now shown) arrayed (or configured) for respectively driving the plurality of pixel electrodes 168. For example, as illustrated in FIG. 1, a transparent substrate S2, on which the TFT array layer 169 and the pixel electrodes 168 are sequentially formed, may be used. Also, as illustrated in FIG. 1, a transparent substrate S1, on which the second electrode 149 of the color filter 140 and the common electrode 161 of the optical shutter portion 160 are respectively formed on opposing surfaces of the transparent substrate S1, may be used. However, example embodiments are not limited thereto. The transparent substrate S1 is not necessarily used. For example, when the second electrode 149 of the color filter 140 and the common electrode 161 of the optical shutter portion 160 have a common function, only one of the second electrode 149 and the common electrode 161 may be formed.

The optical shutter portion 160 may also use general display devices (e.g., a liquid crystal display device, a cholesteric liquid crystal display device, an electrowetting display device, an electrochromic display device, a transmissitive particle type display device, etc.).

The reflection layer 110 is formed under the color filter 140 so that light entering through the color filter 140 is reflected in a direction towards the color filter 140.

Figure 2A:
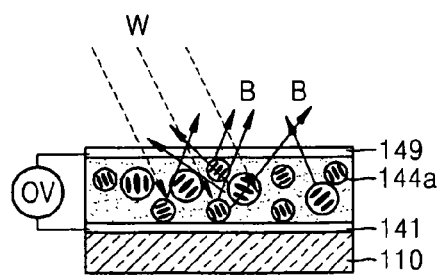
FIGS. 2A and 2B are conceptual diagrams for explaining variations in purity and brightness of a color according to an applied voltage in the color filter of FIG. 1.
Figure 2B:
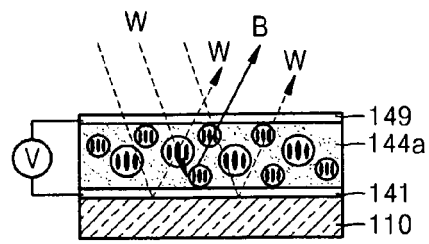

FIGS. 2A and 2B are conceptual diagrams for explaining variations in purity and brightness of a color according to an applied voltage in the color filter of FIG. 1.

FIG. 2A shows a case where a voltage is not applied between the first electrode 141 and the second electrode 149. In this case, refractive indexes of the liquid crystal drops 146 and the polymer 144a are different. Thus, incident white light W is scattered by the plurality of liquid crystal drops 146. When the scattered white light W arrives at the color display materials 148b in the liquid crystal drops 146, only blue light B is reflected and other colors of light are absorbed. Thus, a blue color is displayed.

FIG. 2B shows a case where a voltage is applied between the first electrode 141 and the second electrode 149. In this case, liquid crystal constituting the liquid crystal drops 146 is arranged in a set direction, and refractive indexes of the liquid crystal drops 146 and the polymer 144a become equal. Thus, incident light may pass through the liquid crystal drops 146. White light W having passed through the liquid crystal drops 146 is reflected in the reflection layer 110 and emitted to the outside. The degree of arrangement of the liquid crystal may be controlled according to an applied voltage, the refractive indexes of the liquid crystal drops 146 and the polymer 144a may be different depending on the degree of arrangement of the liquid crystal. In this case, scattering light may be partially generated. The color display materials 148b reflect only blue light B from among the scattering light, thus a mixed color of white and blue may be displayed. Because a mixture ratio of white to blue may be controlled by a magnitude of the applied voltage, purity and brightness of the displayed blue color may be controlled.

FIGS. 2A and 2B show a case where the blue color is displayed. However, purity and brightness of a color displayed from a red or green sub-pixel may also be controlled.

According to the above-described principle, a voltage is not applied to the color filter 140 in bright outdoors so that a color with a substantially high purity may be realized. In relatively dark indoors, a brighter color may be realized by applying a voltage to reduce an absorption ratio of light, thereby securing visibility.

Figure 3:
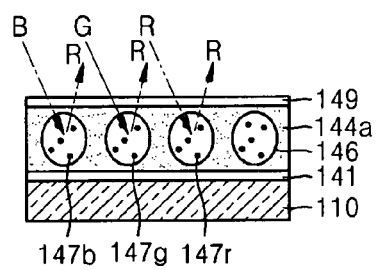
FIG. 3 illustrates a color display material in a color filter according to example embodiments.

FIG. 3 illustrates a color display material included in a color filter according to example embodiments.

In FIG. 3, the color display material may be quantum dots 147r, 147g and 1478b. That is, the polymer 144a, the plurality of liquid crystal drops 146 dispersed in the polymer 144a, and the quantum dots 147b, 147g and 147r mixed in the liquid crystal drops 146 constitute a variable filter layer. When the quantum dot 147b for exciting a red light R by the blue light B, the quantum dot 147g for exciting the red light R by a green light G, and the quantum dot 147r for reflecting a red light R are mixed in the plurality of liquid crystal drops 146 and when incident white light W is scattered by a difference between refractive indexes of the liquid crystal drops 146 and the polymer 144a, the white light W is scattered and emitted as a red light R by operations in the quantum dots 147b, 147g and 147r. Similarly, because the degree of arrangement of the liquid crystal constituting the liquid crystal drops 146 is controlled according to an applied voltage, the degree to which the white light W is mixed in the displayed color may be controlled. FIG. 3 shows a sub-pixel displaying red color. However, in a sub-pixel displaying blue or green color, purity and brightness may also be controlled according to the same principle.

The color display material included in the liquid crystal drops 146 may be a fluorescent dye, a dichroic dye or a quantum dot.

Figure 4:
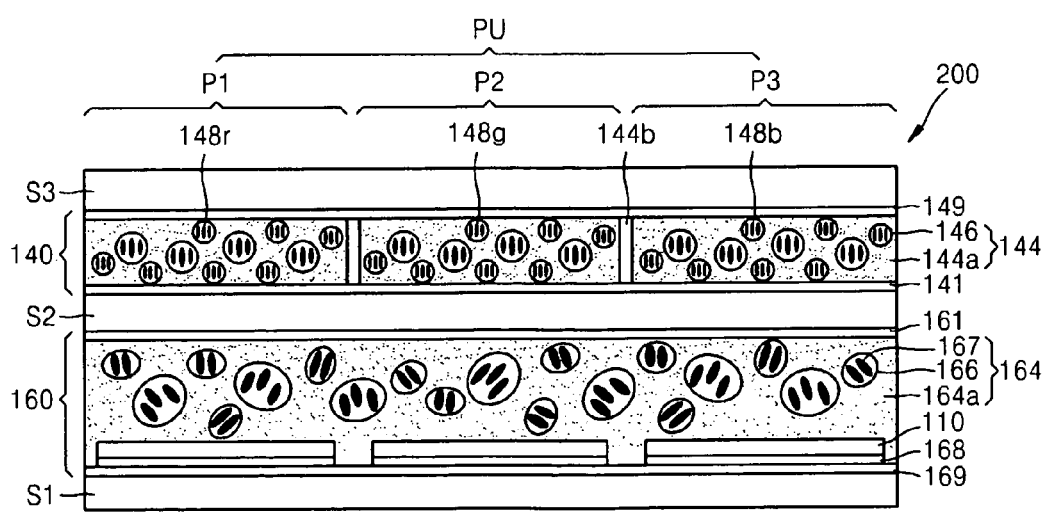
FIG. 4 is a schematic cross-sectional view illustrating a display device according to example embodiments.

FIG. 4 is a schematic cross-sectional view illustrating a display device according to example embodiments.

Referring to FIG. 4, a display device 200 includes a color filter 140, an optical shutter portion 160 and a plurality of reflection layers 110.

The structure of the color filter 140 is the same as that of FIG. 1.

The structure of the optical shutter portion 160 is the same as that described with reference to FIG. 1, except that the arrangement of the common electrode 161, the plurality of pixel electrodes 168 and the TFT array layer 169 is different from that shown in FIG. 1. That is, in FIG. 4, the common electrode 161 is disposed on an optical shutter layer 164, and the plurality of pixel electrodes 168 and the TFT array layer 169 are disposed under the optical shutter layer 164.

In FIG. 4, the optical shutter portion 160 is disposed below the color filter 140. In this case, a second electrode 149 of the color filter 140 may be formed on a surface of a transparent substrate S3. The first electrode 141 of the color filter 140 and the common electrode 161 of the optical shutter portion 160 may be respectively formed on opposing surfaces of the transparent substrate S2. In this case, the transparent substrate S2 is not necessary. That is, when the first electrode 141 of the color filter 140 and the common electrode 161 of the optical shutter portion 160 may have a common function, only one of the first electrode 141 and the common electrode 161 may be formed. A transparent substrate S1, on which the TFT array layer 169 and the plurality of pixel electrodes 168 are sequentially formed, may be used.

The reflection layers 110 may be respectively formed on the plurality of pixel electrodes 168. Because the TFT array layer 169 is disposed under the reflection layers 110 through the above-described arrangement, an aperture ratio may be increased.

Figure 5:
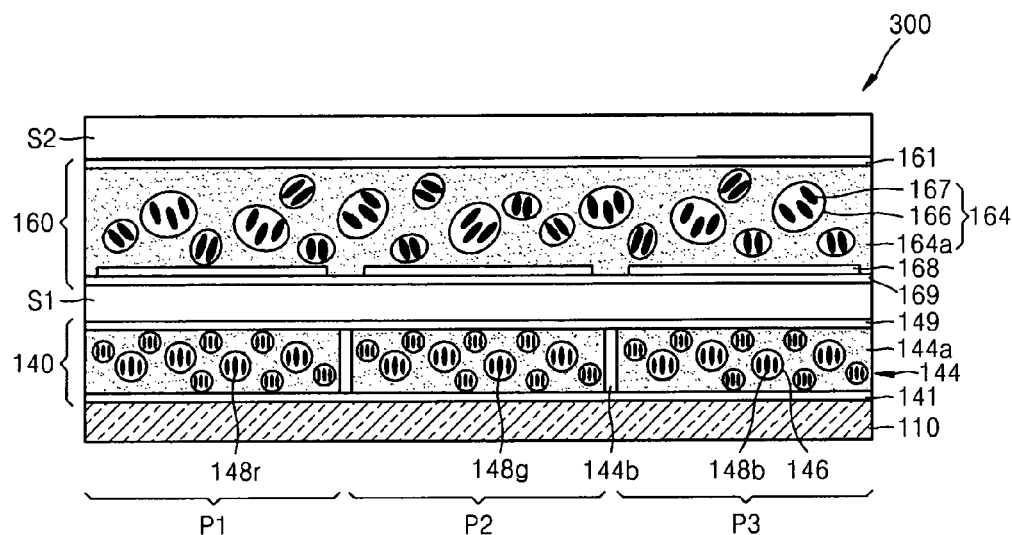
FIG. 5 is a schematic cross-sectional view illustrating a display device according to example embodiments.

FIG. 5 is a schematic cross-sectional view illustrating a display device according to example embodiments.

Referring to FIG. 5, a display device 300 includes a color filter 140, an optical shutter portion 160 and a reflection layer 110. The electrodes of the optical shutter portion 160 in the display device 300 are arranged in a different position that the display device 100 shown in FIG. 1. That is, in FIG. 5, a common electrode 161 is disposed on an optical shutter layer 164, and a plurality of pixel electrodes 168 and a TFT array layer 169 are disposed under the optical shutter layer 164.

Figure 6:
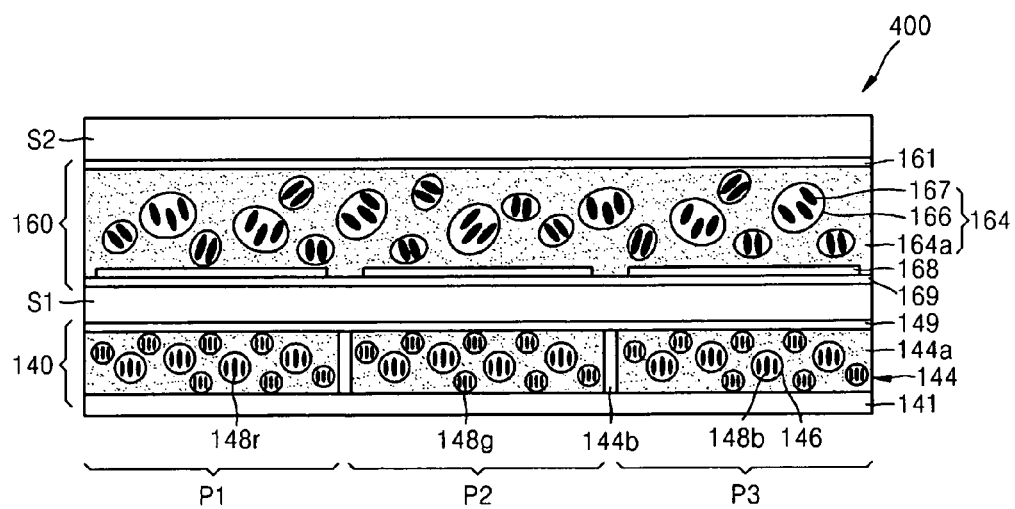
FIG. 6 is a schematic cross-sectional view illustrating a display device according to example embodiments.

FIG. 6 is a schematic cross-sectional view illustrating a display device according to example embodiments.

Referring to FIG. 6, in the display device 400, the first electrode 141 of the color filter 140 is formed of a reflective metal material. The display device 400 of FIG. 6 is similar to the display device 300 shown in FIG. 5 except that the display device 400 does not include a reflection layer (110 of FIG. 5).

Figure 7:
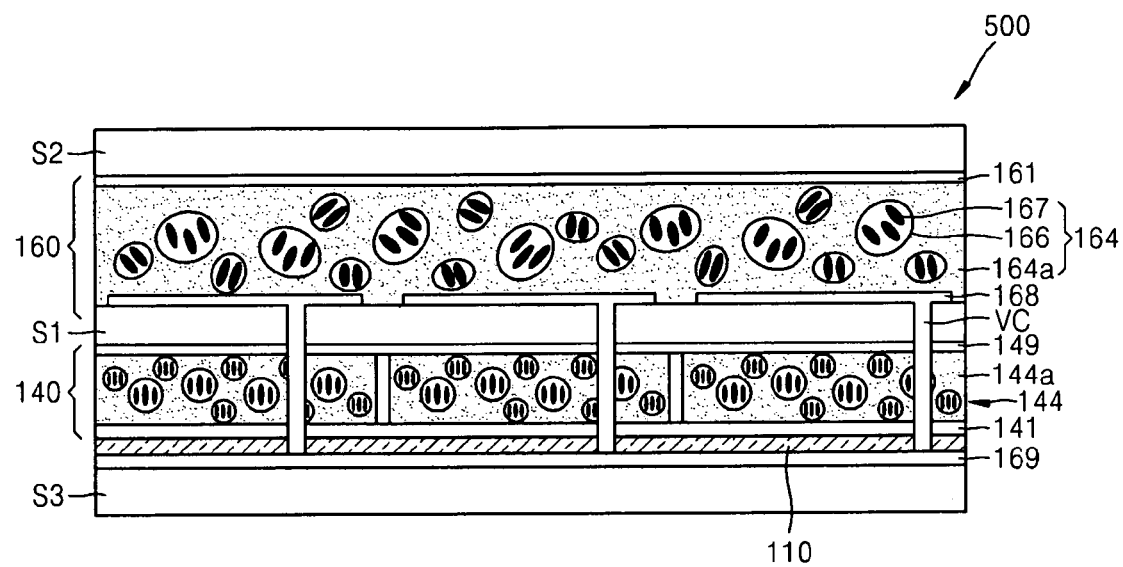
FIG. 7 is a schematic cross-sectional view illustrating a display device according to example embodiments.

FIG. 7 is a schematic cross-sectional view illustrating a display device according to example embodiments.

Referring to FIG. 7, the display device 500 includes a color filter 140, an optical shutter portion 160 and a reflection layer 110.

A TFT array layer 169 of the optical shutter portion 160 is disposed under the reflection layer 110. A contact hole VC configured to connect the pixel electrodes 168 and the TFT array layer 169 may be further formed so as to pass through the color filter 140 and the reflection layer 110. In this structure, the TFT array layer 169 is disposed under the reflection layer 110 so that an internal structure of the TFT array layer 169 does not affect an aperture ratio. Thus, the aperture may be increased.

Figure 8A:
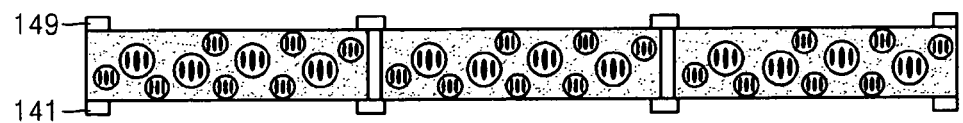
FIGS. 8A and 8B respectively show a cross-sectional view and a plan view of a first electrode and a second electrode of a color filter according to example embodiments.
Figure 8B:
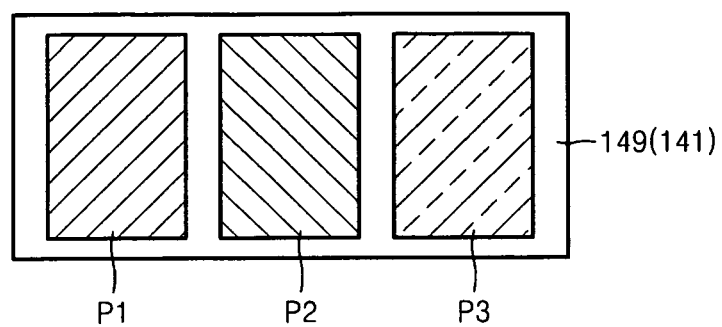

FIGS. 8A and 8B respectively show a cross-sectional view and a plan view of a first electrode and a second electrode of a color filter according to example embodiments.

In general, both the first electrode 141 and the second electrode 149 of the color filter 140 are formed of a transparent electrode. Transmittances of the first electrode 141 and the second electrode 149 affect the quality of a displayed image. Both the first electrode 141 and second electrode 149 illustrated in FIG. 8B have a mesh pattern, so that an area covering sub-pixels P1, P2 and P3 may be reduced. Areas between the sub-pixels P1, P2 and P3 are dead zones that do not affect a displayed image. In the mesh patterns of the first electrode 141 and the second electrode 149, an electrode is disposed only in a region facing the dead zone.

FIGS. 8A and 8B show a case where both the first and second electrodes 141 and 149 have a mesh pattern. However, example embodiments are not limited thereto. For instance, only one of the first and second electrodes 141 and 149 may have a mesh pattern. For example, in the display device 400 of FIG. 6, in which the first electrode 141 of the color filter 140 is formed of a reflective metal material so as to also serve as a reflection layer, only the second electrode 149 may have a mesh pattern. When one or both of the first and second electrodes 141 and 149 is/are formed in the mesh pattern as illustrated in FIGS. 8A and 8B, a driving voltage for the arrangement of liquid crystal may be slightly increased, but light transmittance is further increased.

Figure 9:
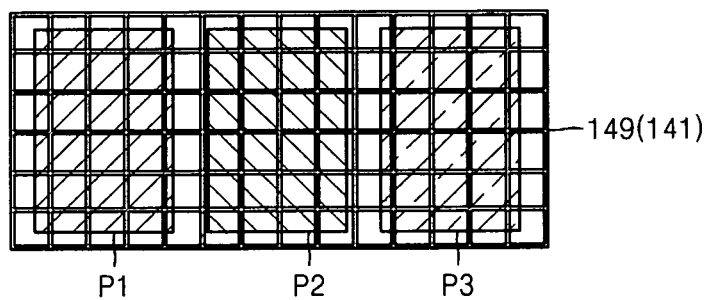
FIG. 9 is a plan view illustrating a first electrode or a second electrode of a color filter according to example embodiments.

FIG. 9 is a plan view illustrating a first electrode or a second electrode of a color filter according to example embodiments.

Mesh patterns of the first and second electrodes 141 and 149 of FIG. 9 are different from those of FIG. 8 in that the mesh patterns of the first and second electrodes 141 and 149 shown in FIG. 9 are finer than those shown in FIG. 8. In this case, the degree of increase in light transmittance in FIG. 9 is less than that in FIG. 8, but a driving voltage for the arrangement of liquid crystal in FIG. 9 may be further decreased than that in FIG. 8.

Figure 10:
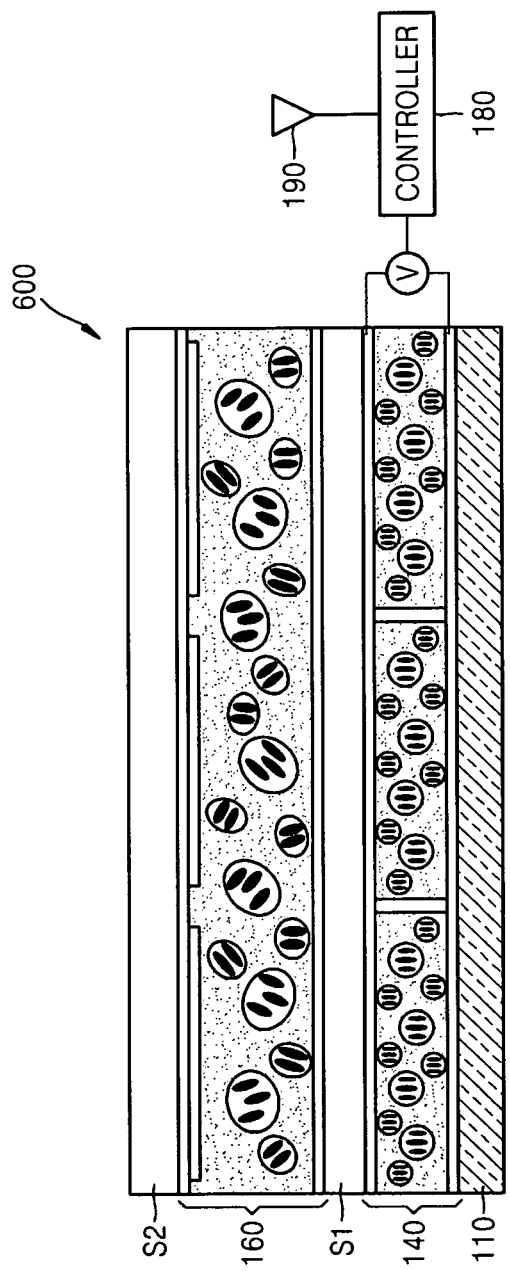
FIG. 10 is a schematic cross-sectional view illustrating a display device according to example embodiments.

FIG. 10 is a schematic cross-sectional view illustrating a display device according to example embodiments.

Referring to FIG. 10, a display device 600 is similar the display device 100 shown in FIG. 1 except the display device 600 further includes a sensor 190 configured to sense an external luminance and a controller 180 configured to control a voltage applied between first and second electrodes 141 and 149 of a color filter 140 according to the sensed external luminance.

In the above-described color filter, a color function (e.g., purity and/or brightness of a color) may be controlled according to an applied voltage. Thus, a display device including the color filter can provide an image having a good quality appropriate for an external illumination environment.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages. Accordingly, all such modifications are intended to be included within the scope of this invention as defined in the claims. In the claims, means-plus-function clauses are intended to cover the structures described herein as performing the recited function, and not only structural equivalents but also equivalent structures. Therefore, it is to be understood that the foregoing is illustrative of various example embodiments and is not to be construed as limited to the specific embodiments disclosed, and that modifications to the disclosed embodiments, as well as other embodiments, are intended to be included within the scope of the appended claims.

What is claimed is:

1. A display device, comprising:
   a color filter including,
      a first electrode and a second electrode spaced apart from each other, and
      a variable filter layer between the first electrode and the second electrode,
      the variable filter layer including a plurality of liquid crystals dispersed in a first polymer, and a plurality of color display materials mixed in the liquid crystals, and
      the variable filter layer being divided into a plurality of pixel units, wherein each of the pixel units includes a plurality of sub-pixels displaying different colors;
   an optical shutter portion in which transmittance of incident light is individually controlled in a region corresponding to each of the plurality of sub pixels, the optical shutter portion including an optical shutter layer on the color filter, and the optical shutter layer including a material in which transmittance of incident light varies under electrical control; and
   a reflection layer under the color filter, the reflection layer being configured to reflect light entering through the color filter in a direction towards the color filter,
   wherein at least one of the first and second electrodes has a mesh pattern, and
   wherein an electrode portion of the mesh pattern is disposed only in a region facing a dead zone between the plurality of sub-pixels.

2. The display device of claim 1, wherein the optical shutter portion includes:
   the optical shutter layer;
   a common electrode on a first surface of the optical shutter layer and a plurality of pixel electrodes on a second surface of the optical shutter layer so as to correspond to the plurality of sub-pixels, the second surface opposing the first surface; and
   a thin film transistor (TFT) array layer in which a plurality of TFTs configured to drive the plurality of pixel electrodes are arrayed.

3. The display device of claim 2, wherein the optical shutter layer includes liquid crystal dispersed in a second polymer, and
   a black dye within the liquid crystal.

4. The display device of claim 2, wherein the plurality of pixel electrodes and the TFT array layer are on the optical shutter layer.

5. The display device of claim 2, wherein the plurality of pixel electrodes and the TFT array layer are under the optical shutter layer.

6. The display device of claim 2, wherein each of the plurality of pixel electrodes is connected to the TFT array layer by a respective contact hole formed through the color filter and the reflection layer, and
   the TFT array layer is under the reflection layer.

7. The display device of claim 1, wherein the plurality of color display materials include a dichroic dye, a quantum dot or a fluorescent dye.

8. The display device of claim 1, further comprising a sensor configured to sense external luminance; and
   a controller configured to control a voltage applied between the first electrode and the second electrode.

9. A display device, comprising:
   a color filter including,
      a first electrode and a second electrode spaced apart from each other, and
      a variable filter layer between the first electrode and the second electrode,
      the variable filter layer including a plurality of liquid crystals dispersed in a first polymer, and a plurality of color display materials mixed in the liquid crystals, and
      the variable filter layer being divided into a plurality of pixel units, wherein each of the pixel units includes a plurality of sub-pixels displaying different colors;
   an optical shutter portion under the color filter, the optical shutter portion including an optical shutter layer having a material in which transmittance of incident light varies under electrical control, a common electrode on the optical shutter layer, a plurality of pixel electrodes under the optical shutter layer so as to correspond to the plurality of sub-pixels, and a thin film transistor (TFT) array layer in which a plurality of TFTs configured to drive the plurality of pixel electrodes are arrayed; and
   a reflection layer on the plurality of pixel electrodes, the reflection layer being configured to reflect light entering through the optical shutter layer in a direction towards the optical shutter layer,
   wherein at least one of the first and second electrodes has a mesh pattern, and
   wherein an electrode portion of the mesh pattern is disposed only in a region facing a dead zone between the plurality of sub-pixels.

10. The display device of claim 9, wherein the plurality of color display materials include a dichroic dye, a quantum dot or a fluorescent dye.

11. A display device, comprising:
    a color filter including,
       a first electrode and a second electrode spaced apart from each other, and
       a variable filter layer between the first electrode and the second electrode,
       the variable filter layer including a plurality of liquid crystals dispersed in a first polymer, and a plurality of color display materials mixed in the liquid crystals, and the variable filter layer being divided into a plurality of pixel units, wherein each of the pixel units includes a plurality of sub-pixels displaying different colors; and an optical shutter portion in which transmittance of incident light is individually controlled in a region corresponding to each of the plurality of sub-pixels, the optical shutter portion being on the color filter, wherein one of the first and second electrodes is formed of a reflective metal material, wherein at least one of the first and second electrodes has a mesh pattern, and wherein an electrode portion of the mesh pattern is disposed only in a region facing a dead zone between the plurality of sub-pixels.

12. The display device of claim 11, wherein one of the first and second electrodes that has a mesh pattern is not formed of the reflective metal material.

\* \* \* \* \*